(12) United States Patent
Westfall et al.

(10) Patent No.: US 6,515,787 B1
(45) Date of Patent: Feb. 4, 2003

(54) ELECTROCHROMIC LAYER

(75) Inventors: Raymond T. Westfall, Seminole, FL (US); Nikolai Kislov, Tampa, FL (US)

(73) Assignee: Eclipse Energy Systems, Inc., St. Petersburg, FL (US)

( * ) Notice: Subject to any disclaimer, the term of this patent is extended or adjusted under 35 U.S.C. 154(b) by 0 days.

(21) Appl. No.: 09/800,869

(22) Filed: Mar. 7, 2001

Related U.S. Application Data
(60) Provisional application No. 60/187,704, filed on Mar. 7, 2000.

(51) Int. Cl.[7] .............................. G02F 1/15; H01M 6/18
(52) U.S. Cl. ...................... 359/265; 359/275; 429/304
(58) Field of Search ................................. 359/265, 266, 359/267, 268, 269, 270, 271, 272, 273, 274, 275; 429/304, 33, 188

(56) References Cited

U.S. PATENT DOCUMENTS

| | | |
|---|---|---|
| 3,940,205 A | 2/1976 | Crandall et al. |
| 3,943,369 A | 3/1976 | Saeva |
| 3,944,333 A | 3/1976 | Leibowitz |
| 3,986,771 A | 10/1976 | Tsukada |
| 4,033,685 A | 7/1977 | Uno et al. |
| 4,054,890 A | 10/1977 | Shimomura |
| 4,088,395 A | 5/1978 | Giglia |
| 4,110,015 A * | 8/1978 | Reddy |
| 4,142,781 A | 3/1979 | Baur et al. |
| 4,150,876 A | 4/1979 | Yevick |
| 4,174,152 A | 11/1979 | Giglia et al. |
| 4,253,742 A * | 3/1981 | Morita |
| 4,443,057 A | 4/1984 | Bauer et al. |
| 4,491,392 A * | 1/1985 | Elmer et al. |
| 4,536,998 A | 8/1985 | Matteucci et al. |
| 4,602,847 A | 7/1986 | Born et al. |
| 4,645,308 A | 2/1987 | Tracey et al. |
| 4,687,560 A * | 8/1987 | Tracy et al. |
| 4,690,508 A | 9/1987 | Jacob |
| 4,799,745 A | 1/1989 | Meyer et al. |
| 4,832,463 A | 5/1989 | Goldner et al. |
| 4,838,648 A | 6/1989 | Phillips et al. |
| 4,889,414 A | 12/1989 | Rauh et al. |
| 4,902,108 A | 2/1990 | Byker |
| 5,002,701 A | 3/1991 | Saxe |
| 5,051,274 A | 9/1991 | Goldner et al. |
| 5,128,799 A | 7/1992 | Byker |
| 5,130,057 A | 7/1992 | Saxe |
| 5,151,824 A | 9/1992 | O'Farrell |
| 5,155,627 A | 10/1992 | Keehn et al. |
| 5,160,668 A | 11/1992 | Imus |
| 5,171,413 A | 12/1992 | Arntz et al. |
| 5,189,550 A | 2/1993 | Goldner et al. |
| 5,200,855 A | 4/1993 | Meredith, Jr. et al. |
| 5,202,787 A | 4/1993 | Byker et al. |
| 5,204,778 A | 4/1993 | Bechtel |
| 5,216,536 A | 6/1993 | Agrawal |
| 5,220,317 A | 6/1993 | Lynam et al. |
| 5,233,461 A | 8/1993 | Dornan et al. |
| 5,239,406 A | 8/1993 | Lynam |
| 5,239,495 A | 8/1993 | Varaprasad et al. |
| 5,252,354 A | 10/1993 | Cronin et al. |
| 5,260,821 A * | 11/1993 | Chu et al. |
| 5,302,449 A | 4/1994 | Eby et al. |
| 5,384,653 A | 1/1995 | Benson et al. |
| 5,404,244 A * | 4/1995 | Van Dine et al. |
| 5,659,417 A * | 8/1997 | Van Dine et al. |
| 5,663,829 A * | 9/1997 | Lefrou et al. |
| 5,666,771 A * | 9/1997 | Macquart et al. |
| 5,757,537 A * | 5/1998 | Ellis, Jr. et al. |
| 5,780,160 A * | 7/1998 | Allemand et al. |
| 6,277,523 B1 * | 8/2001 | Giron .................. 429/304 |

\* cited by examiner

*Primary Examiner*—Georgia Epps
*Assistant Examiner*—Tuyen Tra
(74) *Attorney, Agent, or Firm*—Frijouf, Rust & Pyle, P.A.

(57) ABSTRACT

An improved electrochromic device comprising a substrate and a first conductive layer located on the transparent substrate. An ion storage layer is located on the first conductive layer. An electrolyte layer is located on the ion storage layer with an active layer being located on the electrolyte layer. A second conductive layer is located on the active layer.

34 Claims, 11 Drawing Sheets

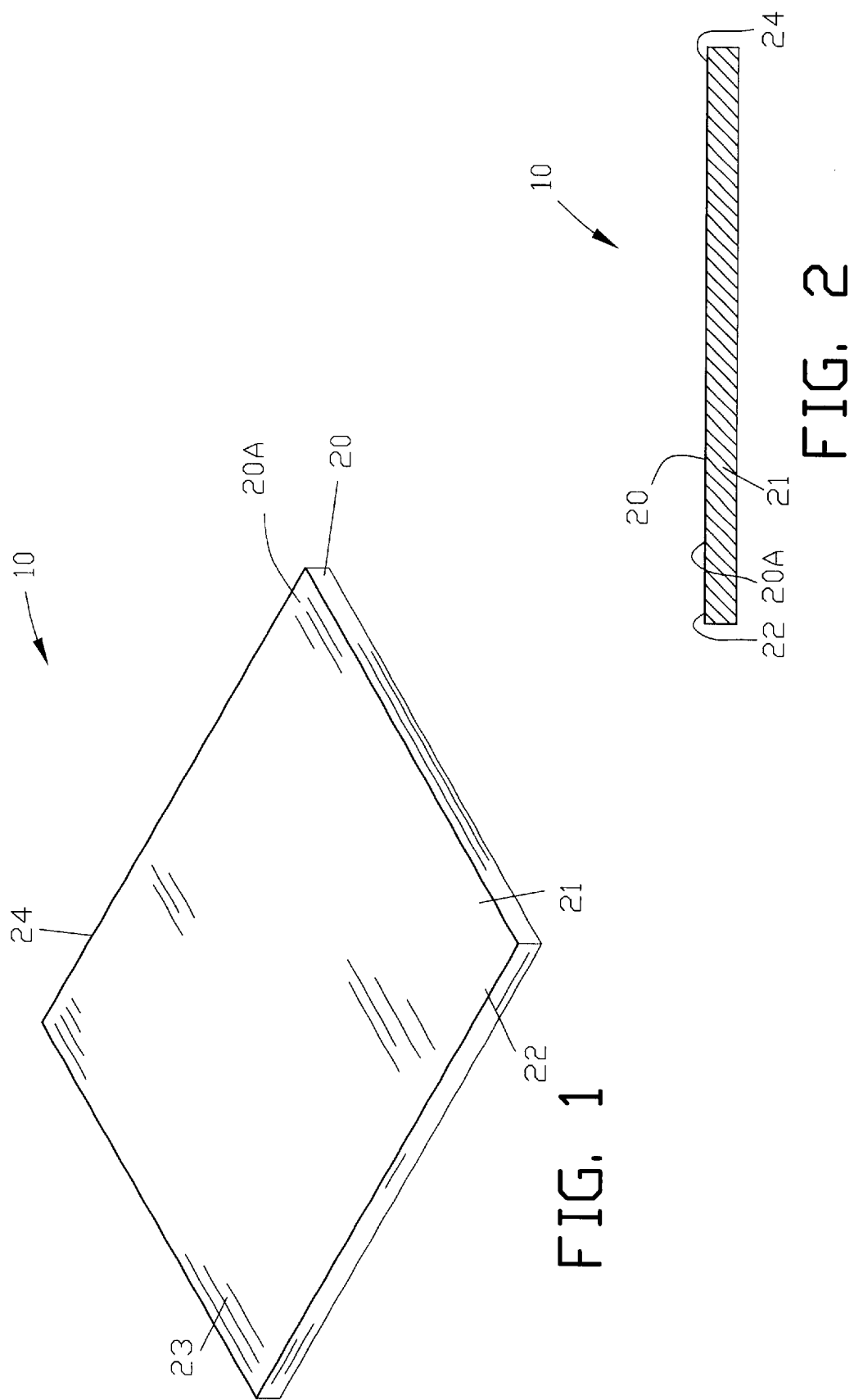

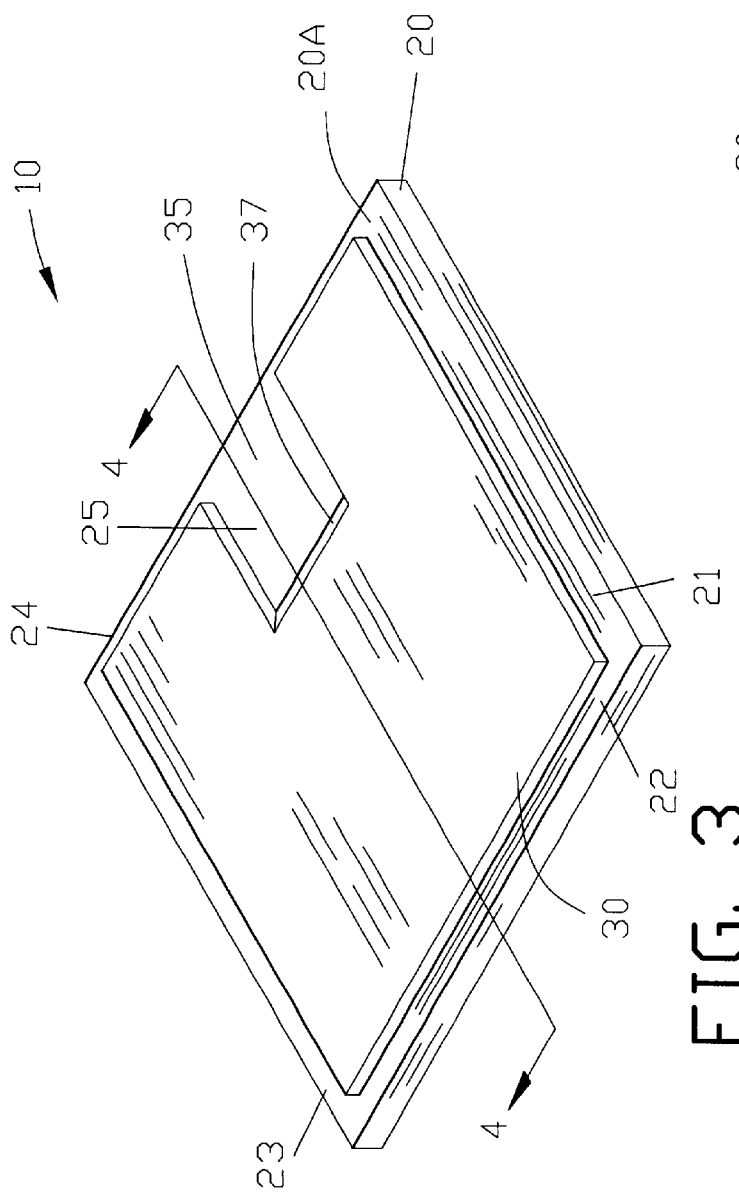
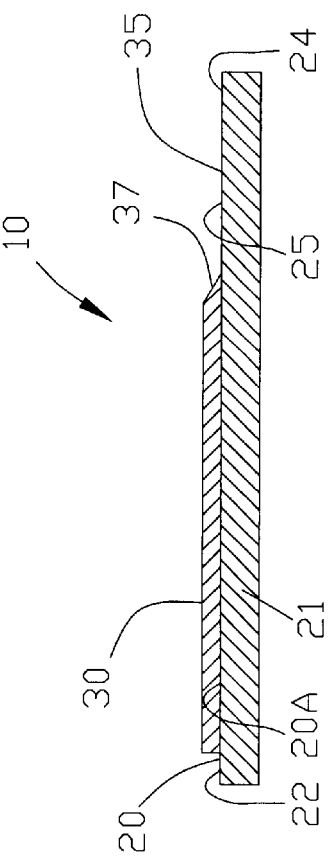
FIG. 3
FIG. 4

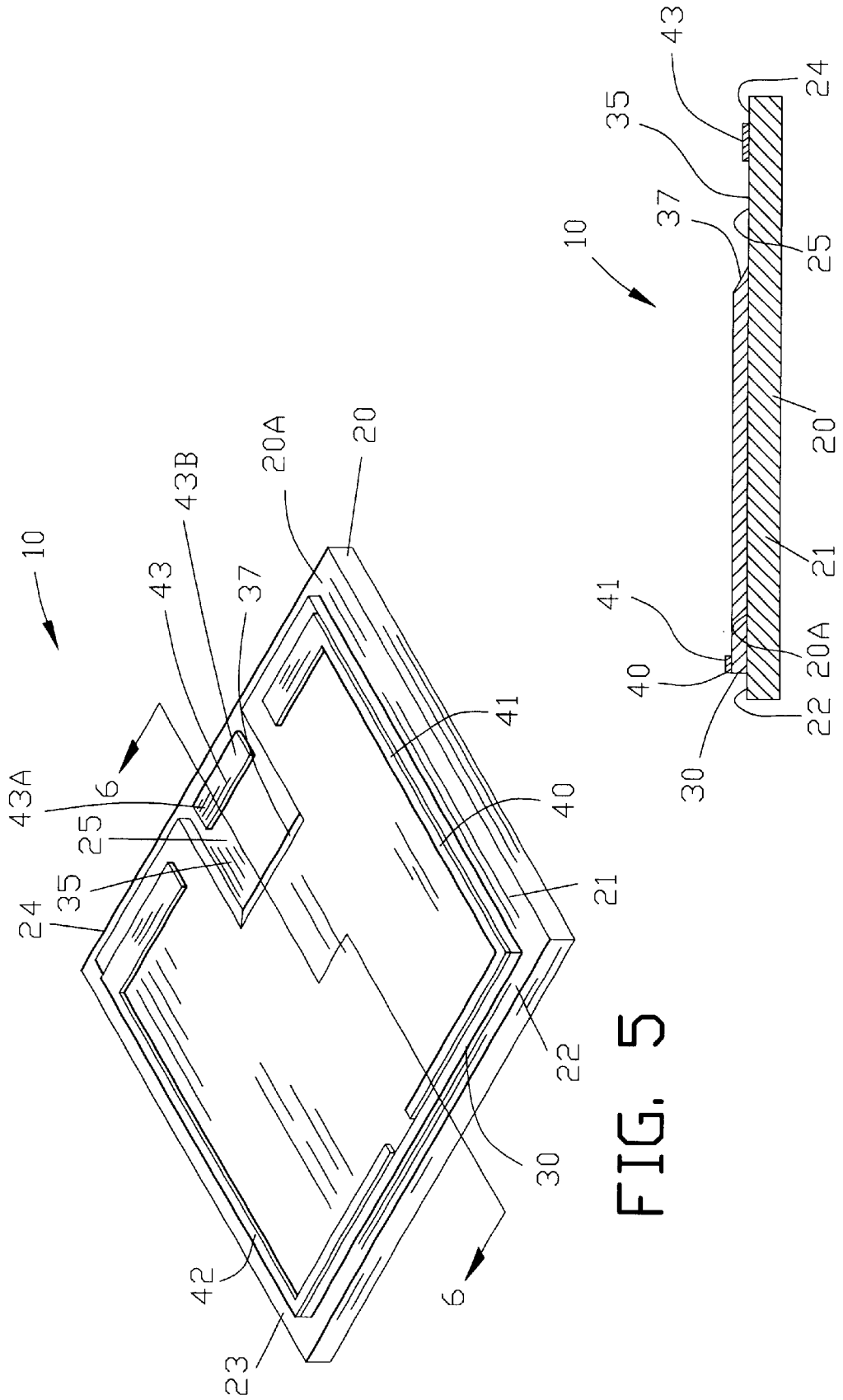

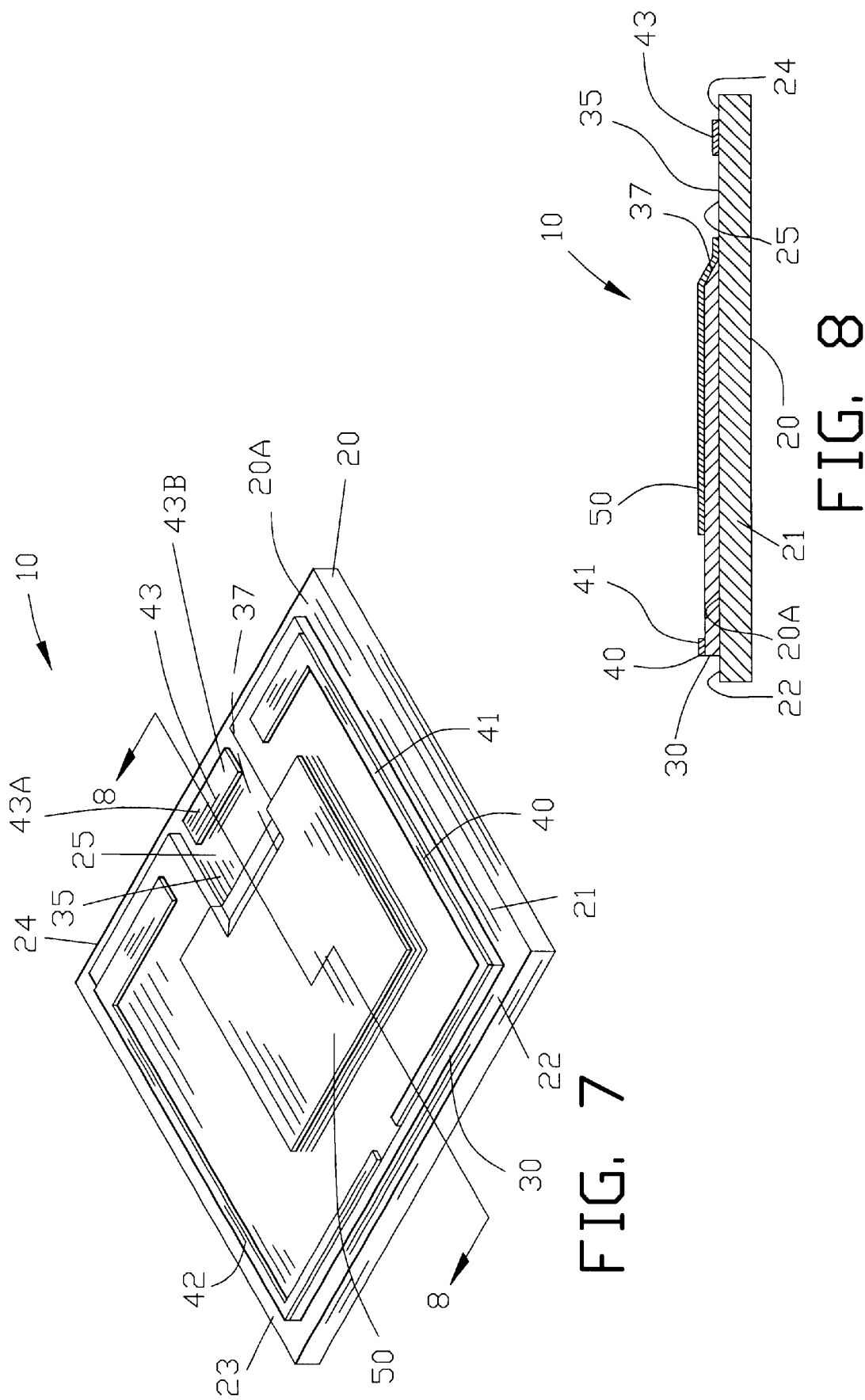

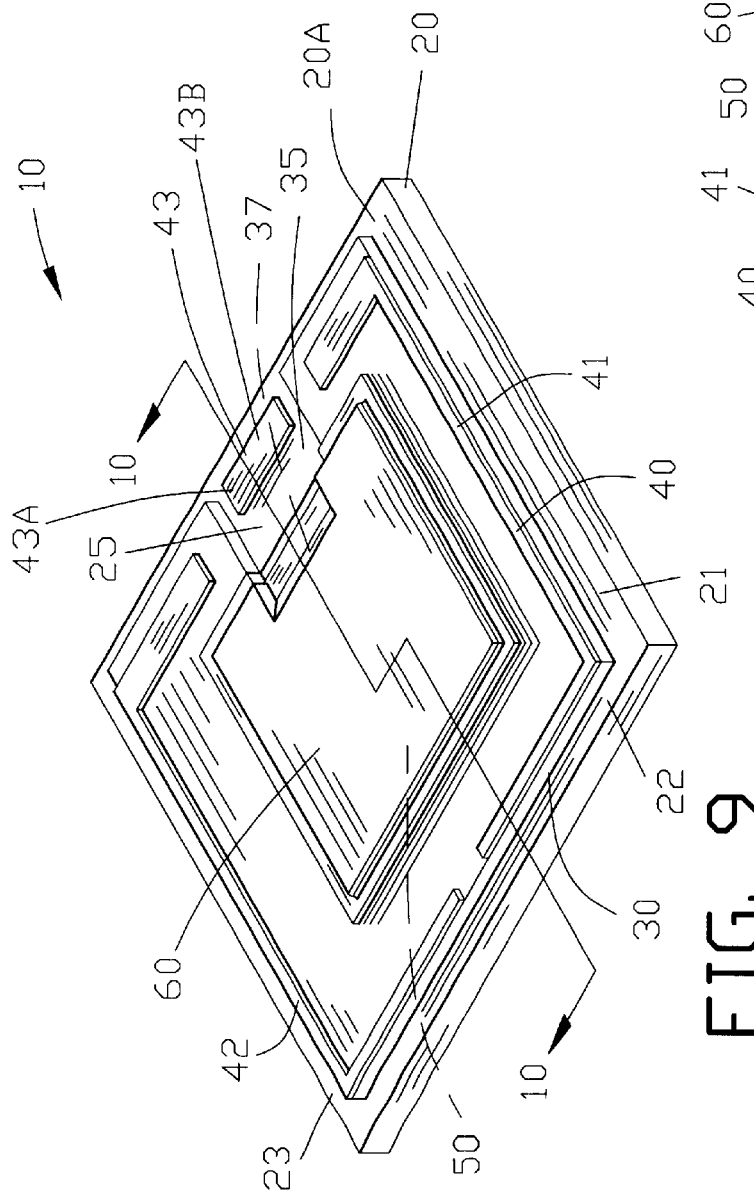
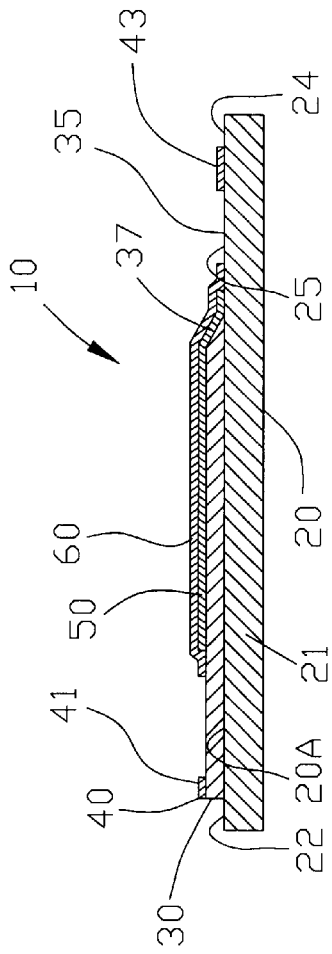
FIG. 9
FIG. 10

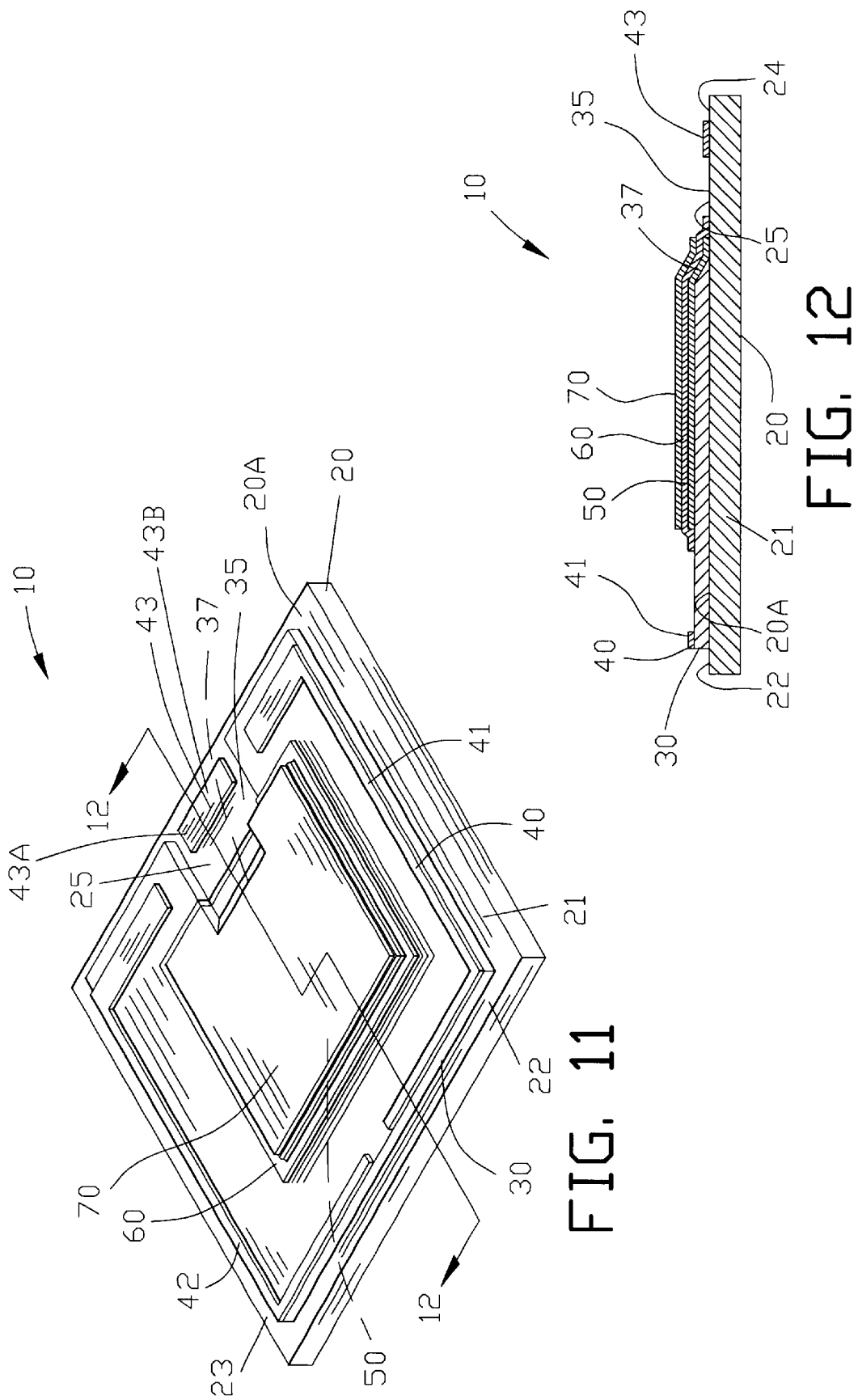

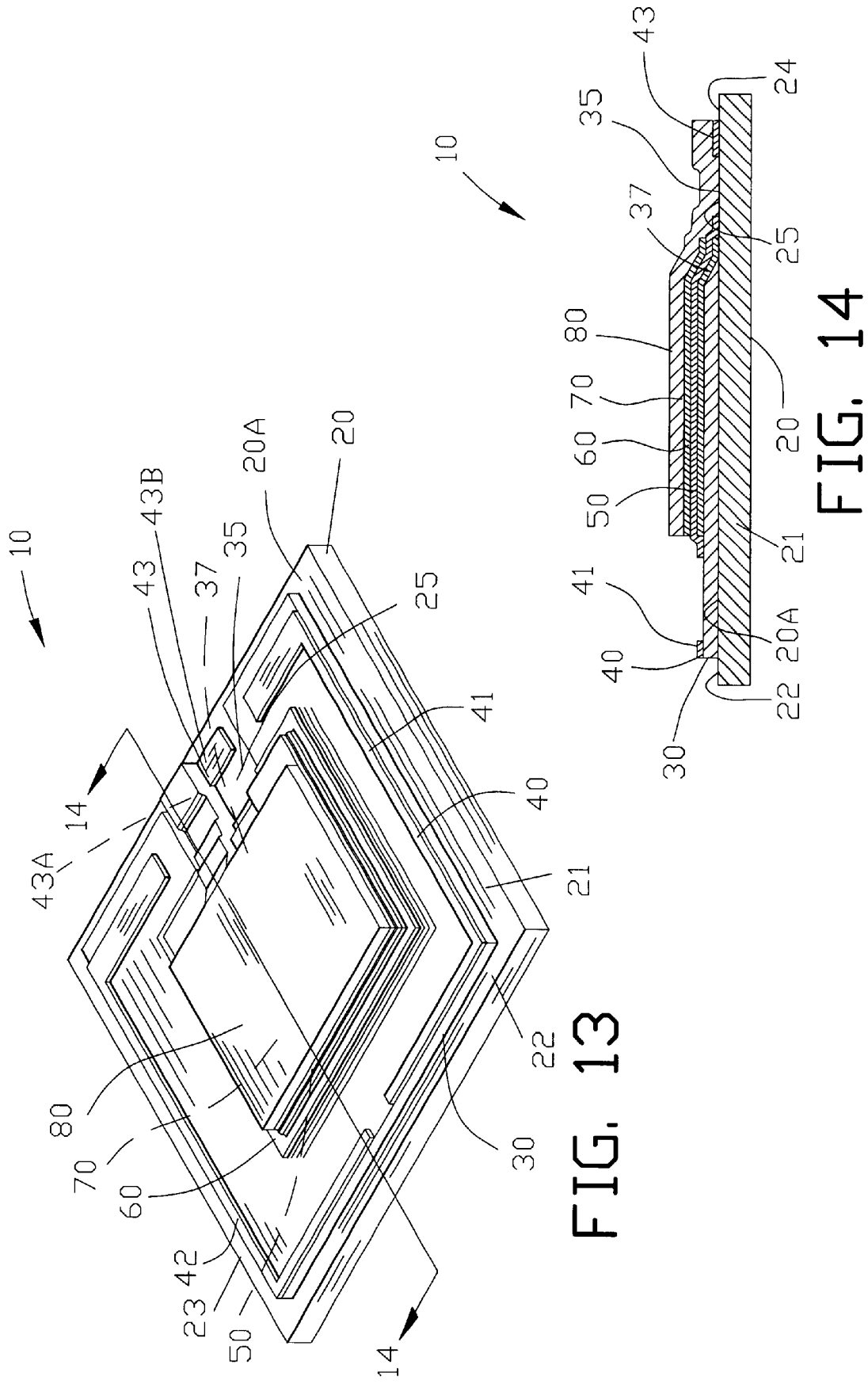

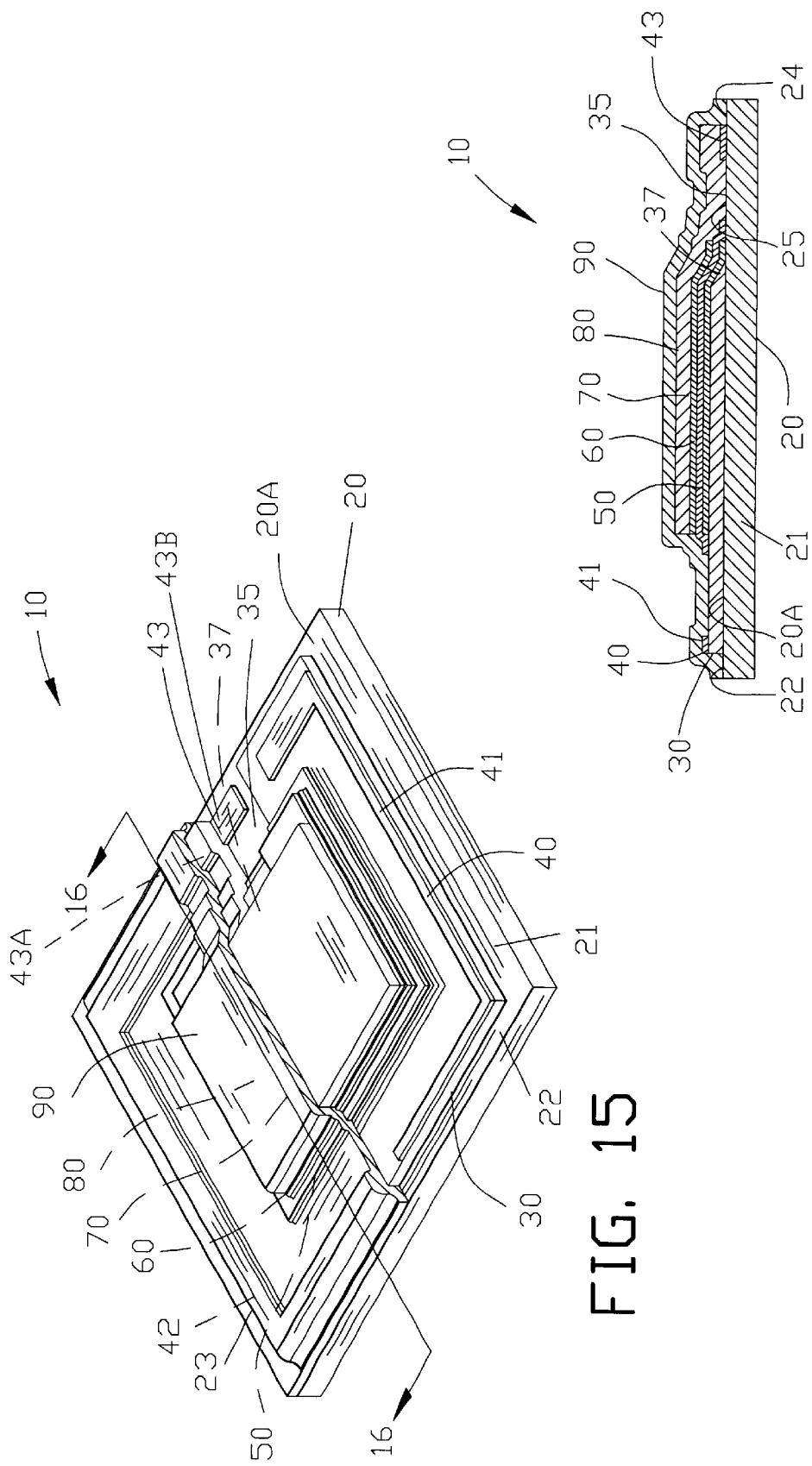

ELECTROCHROMIC LAYER

CROSS-REFERENCE TO RELATED APPLICATIONS

This application claims benefit of United States Patent Provisional application Ser. No. 60/187,704 filed Mar. 7, 2000. All subject matter set forth in provisional application serial No. 60/187,704 is hereby incorporated by reference into the present application as if fully set forth herein.

BACKGROUND OF THE INVENTION

1. Field of the Invention

This invention relates to variable reflective and variable transmission layers and more particularly to an improved electrochromic device with superior variable reflective and variable transmission properties.

2. Background of the Related Art

Electrochromic devices operate in a manner similar to the operation of a battery. In a battery, electrons or ions are stored in layers of materials commonly referred to as battery plates. The ions are available to move to perform work when connected to an external electrical circuit.

An electrochromic device has an electron/ion storage layer and an electron/ion active layer. In the electrochromic device, the charge state of the active layer affects the optical properties of the electrochromic device. When an ionic species (+) is drawn into the active layer by an applied voltage the active layer of the electrochromic device becomes opaque. When the voltage is reversed, the ionic species (+) moves away from the active layer to the storage layer and the active layer of the electrochromic device becomes clear.

An electrochromic device is made of several layers of materials with each layer being capable of transmitting light in the visible spectrum. Since the electrochromic device must be capable of transmitting light in the visible spectrum, each of the several layers is made appropriately thin.

The active layer of the electrochromic device which stores the ions and changes optical properties is usually a transition metal oxide such as tungsten trioxide ($WO_3$) or nickel oxide (NiO). Tungsten based devices dominate research since the optical properties are more suited for solar spectral abatement. The $WO_3$ film is dominated by dense highly columnar regions and an intermolecular void network. With a small negative voltage applied to the top electrode closest to the $WO_3$ film, positively charged ions diffuse into these voids from the ion storage layer through the electrolyte. This changes the stoichiometry and optical characteristics darkening the electrochromic film. The amount of light transmitted through the film can be adjusted by controlling the voltage applied to the device or the length of time the voltage is applied to the device. The film can then be discharged and made transparent by reversing the voltage.

The other critical layer to the electrochromic device is the ion-conductor layer (analogous to the electrolyte in a battery). The ion conductor layer must be able to pass ions into the adjoining electrochromic layer yet suppress electron transport. Organic polymers as well as solid state electrolyte materials have been successfully demonstrated as ion conductor layers. Organics are relatively inexpensive, easy to apply, and flexible. Unfortunately, organic emulsions are the most sensitive to ultraviolet light and weathering degradation.

Solid state electrolytes such as tantalum pentoxide $Ta_2O_5$, magnesium fluoride MgF, or lithium nitride $Li_3N$ can be more difficult to apply but are more stable and offer better durability properties necessary for large scale applications such as windows or the like.

The final layer used in the electrochromic device is the ion storage layer. The ion storage layer may be fabricated from materials such as vanadium pentoxide $V_2O_2$.

Electrodes for the electrochromic device may be either of a transmissive electrode or a reflective electrode. Although many types of transparent conductors are available, the most popular material for transmissive electrode is indium-tin-oxide (ITO). Although many types of reflective conductors are available, the most popular materials for reflective electrode are silver and aluminum.

U.S. Pat. No. 4,110,015 to Reddy discloses an improved electrolyte for use in electrochromic devices. These electrolytes are prepared by the incorporation of a lithium salt in a solvent selected from dimethylsulfite, nitromethane, and sulfolane.

U.S. Pat. No. 4,253,742 to Morita discloses an electrochromic display cell comprising a display electrode, a counter electrode spaced from and facing the display electrode and an electrochromic layer deposited on the display electrode, and a solid electrolyte layer conductive to lithium ion disposed between the electrodes. The solid electrolyte layer is formed from materials selected from the group consisting of $Li_3N$, $Li_{2+x}C_{1-x}B_xO_3$, $Li_{4+x}Si_{1-x}P_xO_4$ and $Li_{5+x}Ag_{1-x}Si_xO_4$ where $0<x<1$.

U.S. Pat. No. 4,491,392 to Elmer et al. discloses an electrochromic device comprising a solid electrolyte wherein the electrolyte consists of porous glass impregnated with a solid ion-conductive compound such as an alkali metal salt.

U.S. Pat. No. 4,687,560 to Tracy et al. discloses a method of synthesizing electro-optically active reaction products from a plurality of reactants by inducing a reaction by plasma deposition among the reactants. The plasma reaction is effective for consolidating the reactants and producing thin films of electro-optically active transition metal oxides.

U.S. Pat. No. 5,260,821 to Chu et al. discloses an electrochromic system which comprises layers of solid/materials deposited on glass or another substrate. The solids function in an atmosphere that can be dry. One layer is preferably $Li_3AlF_6$ and conducts positive lithium ions. Another layer is a counterelectrode. The counterelectrode is improved to the extent that it can reversibly accept ions from and donate them to the ion conductor while remaining extensively transparent. The counterelectrode can be $Li_xTiO_y$, $(Li_2O)_m(WO_3)_n(Sb_2O_3)$, or $(Li_2O)_m(WO_3)_n$—$(CeO_2)_o$.

U.S. Pat. No. 5,404,244 to Van Dine et al discloses the invention which provides for the simplified production of chromogenic devices including relatively large scale devices in panel form. One or more of the layers of the invention are formed from heated, hydrolyzed gel reaction product of one or more dissolved organo-inorganics, such as alkoxides, which may be metallic. The invention includes an ion-conducting layer which comprises a lithium based ceramic material containing residual organic impurities.

U.S. Pat. No. 5,659,417 to Van Dine et al. discloses electrochromic devices applied to a substrate including an electrochromic electrode layera, a counterelectrode layer and an ion-conducting layer sandwiched between those two layers and electrically isolating them from each other. The ion-conducting layer is substantially uniform across the substrate and comprises an inorganic superstructure with associated organic material and with a microstructure which facilitates the transfer of ions. Methods for producing these devices are also disclosed including depositing the ion-conducting layer on the substrate in the form of a solution, and effecting gelation of that solution.

U.S. Pat. No. 5,663,829 to Lefrou et al. discloses an electrochromic system comprising a transparent electrically conducting film, a film of a cathodic electrochromic material, which is capable of reversibly inserting $M^+$ cations of type $H^+$ or $Li^+$, an electrolyte film, counter-electrode film made of an anodic electrochromic material, and a second electrically conducting film. The structure having a barrier film interposed between the electrolyte and the counter-electrode. The barrier film is open to the diffusion of the $M^+$ cations and is constituted of the following materials selected from the group consisting of oxides of metals of Group VB of the Periodic Table, mixtures of these oxides, $CeF_3$, $Sb_2O_3$, HUP (hexauranylphosphate), $Cr_2O_3$, $ZrO_2$, and an ion conductor material of $Li_3N$, $LiTaO_3$, $LiAlF_4$, $Li_3PO_4$, $LiBO_2$ or $LiNbO_3$.

U.S. Pat. No. 5,666,771 to Macquart et al. discloses an invention which concerns an electrochromic pane comprising a principal functional film constituted of a material which under the effect of an electric current is capable of reversibly inserting cations and which has characteristics of coloration and/or transmission in certain wavelengths of electromagnetic radiation that differ for its inserted and deinserted states. The principal functional film has a quasi-columnar structure, with axes of growth of the columns parallel to straight lines contained within a dihedron, the opening of which is less than 20 degrees and the bisector plane of which makes an acute angle with the substrate.

U.S. Pat. No. 5,757,537 to Ellis, Jr. et al. discloses an electrochromic device which may be used for large surface area applications. The devices utilize optical tuning to minimize optical interference between layers of the structure and to maximize uniform optical transparency. Optical tuning also enables transparent conductive oxide layers to be replaced by thin conductive metal layers, thereby reducing the overall thickness of these devices and facilitating the manufacturing process.

U.S. Pat. No. 5,780,160 to Allemand et al. discloses electrochromic devices and processes for preparing the same which are provided which do not require a separate process step of ion intercalation by employing an electrochromically-inert reducing or oxidizing additive in the electrochemically active material or the electrolyte of the electrochromic devices.

Although the aforementioned patents have made advancement to the electrochromic art, the aforementioned patents have not provided electrochromic devices suitable for large scale in a wide variety of uses and applications.

Therefore, an object of this invention is to provide an improved electrochromic device with superior properties than heretofore known in the art.

Another object of this invention is to provide an improved electrochromic device having a rapid response heretofore unknown in the electrochromic art.

Another object of this invention is to provide an improved electrochromic device which may be manufactured on a commercial basis at a reasonable cost.

Another object of this invention is to provide an improved electrochromic device which is reliable and durable enabling the improved electrochromic device to be used in hostile environments.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved method and an improved electrochromic device comprising a substrate and a first conductive layer located on the transparent substrate. An ion storage layer is located on the first conductive layer. An electrolyte layer is located on the ion storage layer with an active layer being located on the electrolyte layer. A second conductive layer is located on the active layer.

In a more specific embodiment of the invention, the improved electrochromic device includes conductive bus bars located on the first conductive layer and located on the transparent substrate. A hermetic layer is bonded to the transparent substrate for sealing the electrochromic device of the present invention.

In one embodiment of the invention, the substrate is substantially transparent. In a more specific example of the invention, the first conductive layer located on the transparent substrate is indium-tin-oxide (ITO).

In another embodiment of the invention, the ion storage layer located on the first conductive layer is vanadium pentoxide ($V_2O_5$). The electrolyte layer located on the ion storage layer is an inorganic solid state electrolyte comprised of lithium phosphate ($Li_3PO_4$).

In one embodiment of the invention, the active layer located on the electrolyte layer is a transition metal oxide. In another example of the invention, the active layer located on the electrolyte layer is selected from the group consisting of tungsten trioxide ($WO_3$) and nickel oxide (NiO). Preferably, the active layer located on the electrolyte layer is tungsten trioxide ($WO_3$).

In still a further embodiment of the invention, the second conductive layer located on the active layer is transparent. In another example of the invention, the second conductive layer located on the active layer is transparent indium-tin-oxide (ITO). In another example of the invention, the second conductive layer located on the active layer is reflective. In another example of the invention, the second conductive layer located on the active layer is reflective aluminum (Al).

The invention is also incorporated into the method of forming the improved electrochromic device wherein at least one of the layers is deposited by vacuum deposition. In another example of the invention, at least one of the layers is deposited by plasma enhanced chemical vapor deposition (PECVD).

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or

BRIEF DESCRIPTION OF THE DRAWINGS

For a fuller understanding of the nature and objects of the invention, reference should be made to the following detailed description taken in connection with the accompanying drawings in which:

FIG. 1 is an isometric view of a transparent substrate of the electrochromic device of the present invention;

FIG. 2 is a side sectional view of FIG. 1;

FIG. 3 is an isometric view similar to FIG. 1 illustrating the deposition of a first conductive layer located on the transparent substrate;

FIG. 4 is a sectional view along line 4—4 of FIG. 3;

FIG. 5 is an isometric view similar to FIG. 3 illustrating the deposition of conductive bus bars located on the first conductive layer and located on the transparent substrate;

FIG. 6 is a sectional view along line 6—6 of FIG. 5;

FIG. 7 is an isometric view similar to FIG. 5 illustrating the deposition of an ion storage layer located on the first conductive layer;

FIG. 8 is a sectional view along line 8—8 of FIG. 7;

FIG. 9 is an isometric view similar to FIG. 7 illustrating the deposition of an electrolyte layer located on the ion storage layer;

FIG. 10 is a sectional view along line 10—10 of FIG. 9;

FIG. 11 is an isometric view similar to FIG. 9 illustrating the deposition of an active layer located on the electrolyte layer;

FIG. 12 is a sectional view along line 12—12 of FIG. 11;

FIG. 13 is an isometric view similar to FIG. 9 illustrating the deposition of a second conductive layer located on the active layer;

FIG. 14 is a sectional view along line 14—14 of FIG. 13;

FIG. 15 is an isometric view similar to FIG. 9 illustrating the deposition of a hermetic layer for bonding with the transparent substrate for sealing the electrochromic device of the present invention;

FIG. 16 is a sectional view along line 16—16 of FIG. 15;

Similar reference characters refer to similar parts throughout the several Figures of the drawings.

DETAILED DISCUSSION

Figure 17:
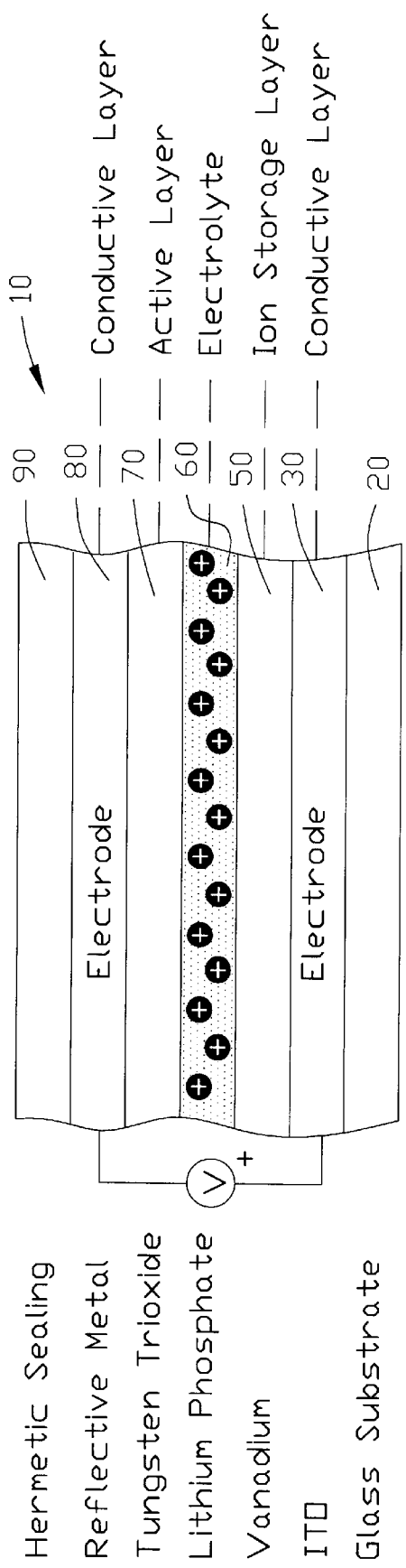
FIG. 17 is an enlarged sectional view of a portion of the electrochromic device of the present invention illustrating the ions in the electrolyte layer.

FIGS. 1–16 are various views illustrating the method of forming an electrochromic device 10 of the present invention. The method of forming the improved electrochromic device 10 includes at least one of the layers being deposited by vacuum deposition or by plasma enhanced chemical vapor deposition (PECVD).

FIGS. 1 and 2 illustrate a substrate 20 of the electrochromic device 10. The substrate is defined by a top surface 20A and peripheral edges 21–24. Preferably, the substrate 20 is substantially transparent. In a more specific example of the invention, the substrate 20 may be a rigid material such as glass or may be a flexible material such as a polymeric material.

FIGS. 3 and 4 illustrate the deposition of a first conductive layer 30 located on the transparent substrate 20. The first conductive layer 30 covers the top surface 20A of the substrate 20 except for a narrow strip around the peripheral edges 21–24 of the substrate 20 and a rectangular area 25. Preferably, the first conductive layer 30 located on the transparent substrate is indium-tin-oxide (ITO). In one example, the first conductive layer 30 is deposited to have a thickness of 2000 to 3000 angstroms.

The first conductive layer 30 includes a notch 35 having a taper 37. The taper 37 extends from the top of the first conductive layer 30 to the substrate 20. The taper 37 extends along the top surface 20A of. the substrate 20 an approximate length of 0.5 mm to 5.0 mm. As will be described in greater detail hereinafter, the taper 37 provides a smooth transition for the addition of subsequently applied layers whose electrical and mechanical properties can be adversely affected by an abrupt transition.

FIGS. 5 and 6 illustrate the deposition of conductive bus bars 40 located on the first conductive layer 30 and located on the transparent substrate 20. The conductive bus bars 40 include a first and a second U-shape conductive bus bar 41 and 42 located on the first conductive layer 30. The conductive bus bars 40 include a conductive bus bar 43 located on the transparent substrate 20. The conductive bus bar 43 is electrically insulated from the first and second U-shape conductive bus bars 41 and 42. The conductive bus bar 43 defines a first portion 43A and a second portion 43B.

The first and second U-shape conductive bus bars 41 and 42 are initially separated to enable the conductivity of the first conductive layer 30 to be tested prior to the addition of subsequently applied layers. After the conductivity of the first conductive layer 30 has been tested, the first and second U-shape conductive bus bars 41 and 42 may be shorted by a connector (not shown) to provide for an external electrical connection to the electrochromic device 10.

Preferably, the conductive bus bars 40 are made from a suitable metallic material such as nickel or the like for enabling an external connection to be made to the electrochromic device 10. In one example, the conductive bus bars 40 were formed from nickel (Ni) and deposited to have a thickness of 1000 to 3000 angstroms for enabling external connection to be soldered to the electrochromic device 10.

FIGS. 7 and 8 illustrate the deposition of an ion storage layer 50 located on the first conductive layer 30. The ion storage layer 50 extends across the tapered edge 35 of the first conductive layer 30. In this example of the invention, the ion storage layer 50 located on the first conductive layer 30 is vanadium pentoxide ($V_2O_5$). In one example, the ion storage layer 50 is deposited to have a thickness of 400 to 3000 angstroms.

FIGS. 9 and 10 illustrate the deposition of an electrolyte layer 60 located on the ion storage layer 50. The electrolyte layer 60 located on the ion storage layer 50 is a solid state electrolyte. The electrolyte layer 60 is located on the ion storage layer 50 and extending across the tapered edge 37 of the first conductive layer 30 to the rectangular area 25 of the substrate 20. As previously stated, the rectangular area 25 of the substrate 20 is not covered with the first conductive layer 30. The electrolyte layer 60 completely covers the entire perimeter of the ion storage layer 50.

In a more specific example of the invention, the electrolyte layer 60 located on the ion storage layer 50 is selected from the group consisting of tantalum pentoxide ($Ta_2O_5$), magnesium fluoride (MgF), lithium nitride ($LiN_3$) and lithium phosphate ($Li_3PO_4$). In this example of the invention, the electrolyte layer 60 is amorphous lithium phosphate ($Li_3PO_4$).

Preferably, the electrolyte layer 60 is deposited to a thickness of less than 1000 angstroms. In one example, the electrolyte layer 60 is deposited to have a thickness of 400 angstroms. A thin electrolyte layer 60 is an important aspect of the present invention.

A thin electrolyte layer 60 reduces the transit time of the ions across the electrolyte layer 60. The transit time of the ions across the electrolyte layer 60 is inversely proportional to the thickness of the electrolyte layer 60. The transit time of the ions is also related to the voltage potential across the electrolyte layer 60. A thin electrolyte layer 60 enables a rapid transit time of the ions across the electrolyte layer 60 at a lower voltage potential across the electrolyte layer 60. Preferably, the electrolyte layer 60 is sufficiently thin to enable the ions to rapidly transit across the electrolyte layer 60 when the electrochromic device 10 is operated at less than one volt. When the electrochromic device 10 is operated at less than one volt, the electrochromic device 10 may be powered by a single photovoltaic cell or a single photoelectric-chemical cell.

Another advantage for operating the electrochromic device 10 at a low voltage is to prevent unwanted electrochemical reactions with water and hydroxyl radicals. The threshold for the hydrolyzation of water is about 1.3 Volts. In the presence of ultra-violet light, a photo-electrochemical reaction can take place at even lower voltages. The thin ion conductor layer allows the electrochromic device 10 to operate successfully at voltages as low as 0.7 Volts which is well below the threshold of the unwanted reactions.

FIGS. 11 and 12 illustrate the deposition of an active layer 70 located on the electrolyte layer 60. Preferably, the active layer 70 is the same size and same registry as the ion storage layer 50. In one embodiment of the invention, the active layer 70 located on the electrolyte layer 60 is a transition metal oxide. In another example of the invention, the active layer 70 located on the electrolyte layer 60 is selected from the group consisting of tungsten trioxide ($WO_3$) and nickel oxide (NiO). Preferably, the active layer 70 located on the electrolyte layer 60 is amorphous or polycrystalline tungsten trioxide ($WO_3$).

FIGS. 13 and 14 illustrate the deposition of a second conductive layer 80 located on the active layer 70. The second conductive layer 80 is an electrically conductive material located on the top of the active layer 70 and extending across and overlaying the tapered edge 37 onto the first portion 43A of the conductive bus bar 43. In this example, the second conductive layer 80 does not cover the second portion 43B of the conductive bus bar 43. The second portion 43B of the conductive bus bar 43 is used for enabling an external connection to be soldered to the second conductive layer 80. The electrolyte layer 60 insulates the second conductive layer 80 from the first conductive layer 30. In a first embodiment of the invention, the second conductive layer 80 is transparent. The second electrically conductive layer 80 may be selected for the group comprising indium-tin-oxide (ITO), fluorine doped tin oxide, or a grid of metallic material or electrically conductive material.

In an alternate example of the invention, the second conductive layer 80 located on the active layer 70 is reflective. In another example of the invention, the second conductive layer 80 located on the active layer 70 is reflective aluminum (Al). The first and second conductive layers 30 and 80 function as first and second electrodes 30 and 80.

FIGS. 15 and 16 illustrate the deposition of a hermetic layer 90 for bonding with the transparent substrate 20 for sealing the electrochromic device 10 of the present invention. In one example, the hermetic layer 90 comprises a protective layer comprised of $SiO_2$ which covers the entire electrochromic stack of layers 30, 50, 60, 70 and 80 and bonds to the peripheral edges 21–24 of the substrate 20 to provide a hermetic encapsulation for the electrochromic device 10.

FIG. 17 is an enlarged sectional view of a portion of the electrochromic device 10 of the present invention illustrating the ions in the electrolyte layer 60. Neither the active layer 70 nor the ion storage layer 50 is intercalated with ions. In this condition the ion storage layer 50 exhibits a very pale transparent yellow color and the active layer 70 is completely transparent.

Figure 18:
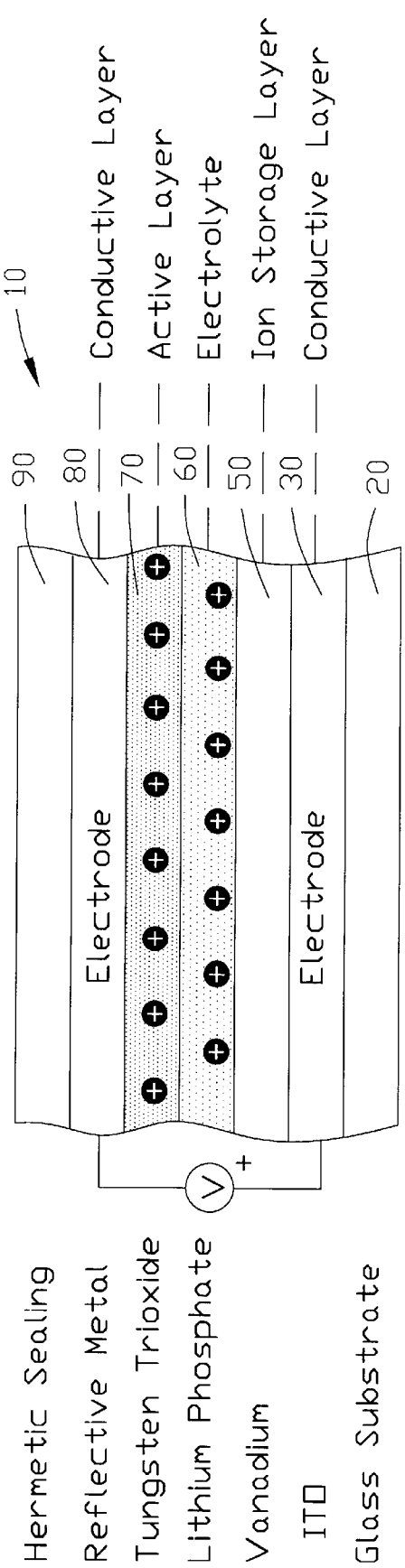
FIG. 18 is a view similar to FIG. 17 illustrating the migration of the ions into the active layer upon application of a voltage between the first and second electrodes.

FIG. 18 is a view similar to FIG. 17 illustrating the migration of the ions into the active layer 70 upon application of a voltage between the first and second conductive layers or electrodes 30 and 80. The electric field that exists between the first transparent electrically conductive layer 30 and the reflective metal layer 80 repels the ions away from the ion storage layer 50 toward the active layer 70. This causes the active layer 70 to darken as the active layer 70 becomes intercalated with the ions reducing transmission of light reflected from the reflective metal electrode 80.

Figure 19:
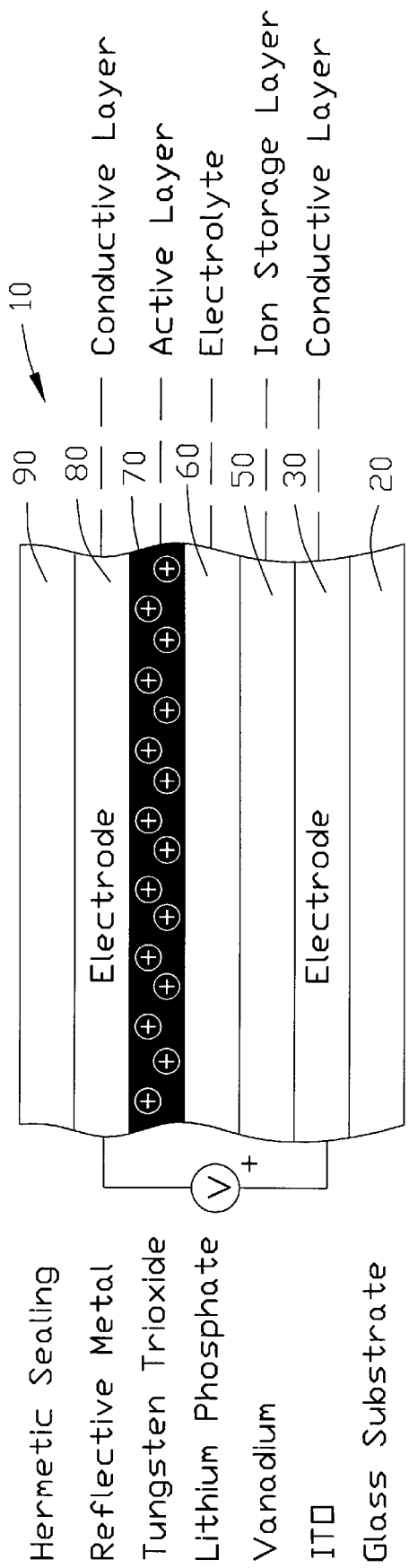
FIG. 19 is a view similar to FIG. 18 illustrating the complete migration of the ions into the active layer thereby processing a darkening of the active layer.

FIG. 19 is a view similar to FIG. 18 illustrating the equilibrium condition when the migration of the ions into the active layer 70 is complete thereby rendering the active layer 70 into a darkest state. The electric current through the electrochromic device 10 ceases to flow because the ions are no longer moving and the only current flowing results from flaws in the electrolyte layer 60.

Figure 20:
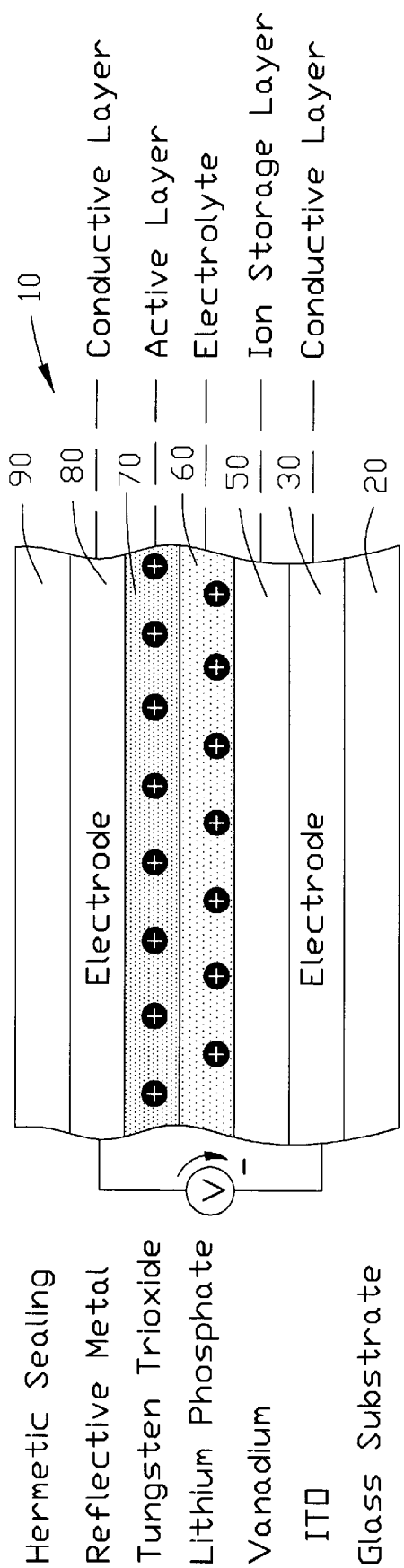
FIG. 20 is a view similar to FIG. 19 illustrating the migration of the ions from the active layer upon application of a reverse voltage between the first and second electrodes.

FIG. 20 is a view similar to FIG. 19 illustrating the migration of the ions from the active layer 70 upon application of a reverse voltage between the first and second electrodes 30 and 80.

The coloration process is reversed as the active layer 70 is de-intercalated and the ions move back into the electrolyte layer 60.

Figure 21:
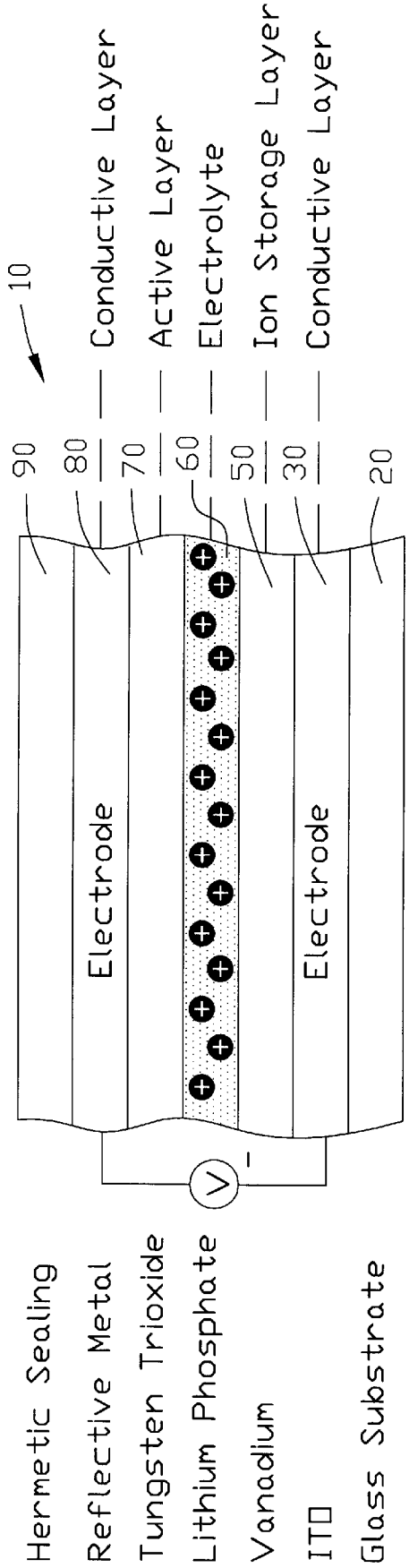
FIG. 21 is a view similar to FIG. 20 illustrating the migration of the ions from the active layer into the electrolyte layer.

FIG. 21 is a view similar to FIG. 20 illustrating the migration of the ions from the active layer 70 into the electrolyte layer 60. The majority of the ions are in the electrolyte layer 60 and the electrochromic device 10 exhibits the same optical properties as shown in FIG. 17.

Figure 22:
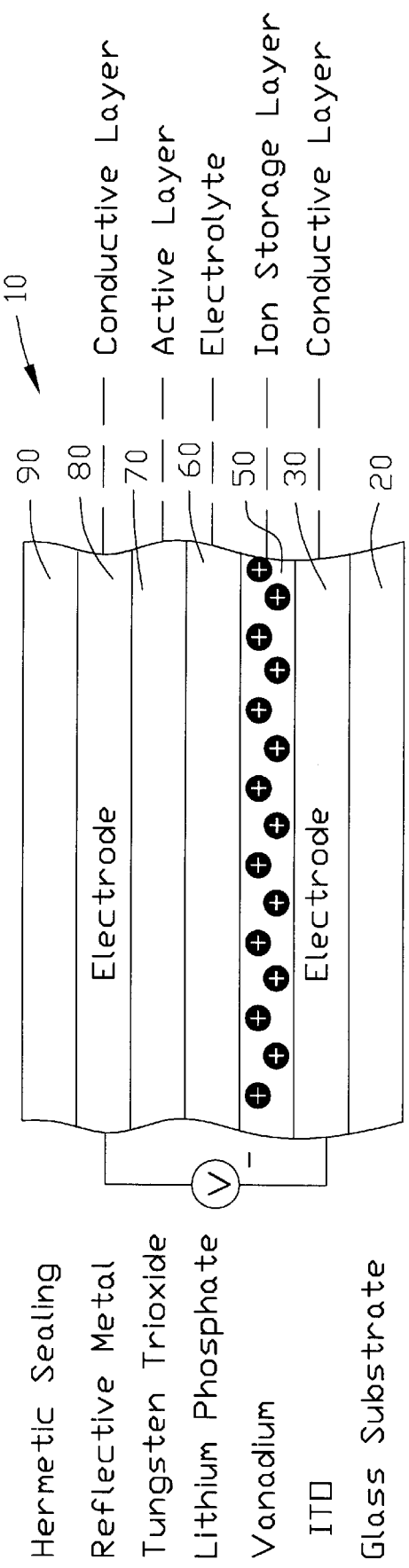
FIG. 22 is a view similar to FIG. 21 illustrating the migration of the ions from the electrolyte layer into the storage layer.

FIG. 22 is a view similar to FIG. 21 illustrating the equilibrium condition when the migration of the ions into the ion storage layer 50 is complete thereby rendering the active layer 70 in the clearest and most transparent state. The electric current through the electrochromic device 10 again ceases to flow because the ions are no longer moving and the only current flowing results from flaws in the electrolyte layer 60 in a manner similar to FIG. 19. The active layer 70 is completely transparent and the ion storage layer 50 is clear.

The electrochromic device 10 provides a variable reflective or a variable transmission layer with superior variable reflective and variable transmission properties.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved electrochromic device, comprising:
   a substrate;
   a first conductive layer located on said substrate;
   an ion storage layer located on the first conductive layer;
   an electrolyte layer located on the ion storage layer;
   said electrolyte layer having a thickness less than 1000 angstroms;
   an active layer located on the electrolyte layer; and
   a second conductive layer located on the active layer.

2. An improved electrochromic device, comprising:
   a substrate;
   a first conductive layer located on said substrate;
   a first and a second conductive bus bars located on said first conductive layer;
   said first and second conductive bus bars being separated for testing the conductivity of said first conductive layer;
   an ion storage layer located on the first conductive layer;
   an electrolyte layer located on the ion storage layer;
   an active layer located on the electrolyte layer; and
   a second conductive layer located on the active layer.

3. An improved electrochromic device, comprising:
   a substrate;
   a first conductive bus bar located on said substrate;
   a first conductive layer located on said substrate;
   a second conductive bus bar located on said first conductive layer;
   an ion storage layer located on the first conductive layer;
   an electrolyte layer located on the ion storage layer;
   an active layer located on the electrolyte layer;
   a second conductive layer located on the active layer; and
   a hermetic layer overlaying said layers and said conductive bus bars for bonding with the transparent substrate for sealing the electrochromic device.

4. An improved electrochromic device as set forth in claim 1, wherein said substrate is substantially transparent.

5. An improved electrochromic device as set forth in claim 1, wherein said first conductive layer located on said substrate is indium-tin-oxide (ITO).

6. An improved electrochromic device as set forth in claim 1, wherein said ion storage layer located on the first conductive layer is vanadium pentoxide ($V_2O_5$).

7. An improved electrochromic device as set forth in claim 1, wherein said electrolyte layer located on the ion storage layer is a solid state electrolyte.

8. An improved electrochromic device as set forth in claim 1, wherein said electrolyte layer located on the ion storage layer is selected from the group consisting of tantalum pentoxide ($Ta_2O_5$), magnesium fluoride (MgF), lithium nitride ($LiN_3$) and lithium phosphate ($Li_3PO_4$).

9. An improved electrochromic device as set forth in claim 1, wherein said electrolyte layer located on the ion storage layer is lithium phosphate ($Li_3PO_4$).

10. An improved electrochromic device as set forth in claim 1, wherein said active layer located on the electrolyte layer is a transition metal oxide.

11. An improved electrochromic device as set forth in claim 1, wherein said active layer located on the electrolyte layer is selected from the group consisting of tungsten trioxide ($WO_3$) and nickel oxide (NiO).

12. An improved electrochromic device as set forth in claim 1, wherein said active layer located on the electrolyte layer is tungsten trioxide ($WO_3$).

13. An improved electrochromic device as set forth in claim 1, wherein said second conductive layer located on the active layer is transparent.

14. An improved electrochromic device as set forth in claim 1, wherein said second conductive layer located on the active layer is transparent indium-tin-oxide (ITO).

15. An improved electrochromic device a set forth in claim 1, wherein said second conductive layer located on the active layer is reflective.

16. An improved electrochromic device as set forth in claim 1, wherein said second conductive layer located on the active layer is reflective aluminum (Al).

17. An improved electrochromic device as set forth in claim 1, wherein at least one of said layers is disposed by vacuum deposition.

18. An improved electrochromic device as set forth in claim 1, wherein at least one of said layers is disposed by plasma enhanced chemical vapor deposition (PECVD).

19. An improved electrochromic device as set forth in claim 1, wherein said electrolyte layer totally overlays said first conductive layer and said ion storage layer.

20. An improved electrochromic device, comprising:
    a substrate;
    a first conductive layer located on said substrate;
    a taper defined in said first conductive layer;
    an ion storage layer located on the first conductive layer;
    an electrolyte layer located on the ion storage layer;
    an active layer located on the electrolyte layer; and
    a second conductive layer located on the active layer.

21. An improved transmissive electrochromic device, comprising a monolithic stack of solid state inorganic materials deposited directly onto a transparent or translucent substrate comprised of glass, polymer, or fiberglass reinforced polymer, comprising:
    a first electrically conductive layer, which is substantially transparent, comprised of ITO, fluorine doped tin oxide, or a grid of metallic or electrically conductive material, located on the top surface of said transparent or translucent substrate;
    an ion storage layer, comprised of vanadium pentoxide ($V_2O_5$), located on the top surface of the first electrically conductive layer;
    an electrolyte layer, comprised of amorphous $Li_3PO_4$, located on the top surface of the ion storage layer;
    said electrolyte layer having a thickness less than 1000 angstroms;
    an active layer located on the electrolyte layer, comprised of amorphous or polycrystalline $WO_3$, located on the top surface of the electrolyte layer;

a second electrically conductive layer, which is substantially transparent, comprised of ITO, fluorine doped tin oxide, or a grid of metallic or electrically conductive material, located on the top surface of the active layer, an electrical contact for the first electrically conductive layer comprised of a Ni pad, suitable for establishing an electrical connection, located on the top surface of the first electrically conductive layer in an area not covered by the ion storage layer, the ion conductor layer, the active layer, or the second electrically conductive layer; and an electrical contact for the second electrically conductive layer comprised of a Ni pad, suitable for establishing an electrical connection, located on the top surface of the substrate in an area not covered by any layers except the second electrically conductive layer.

22. An improved electrochromic device as set forth in claim 21, wherein said substrate is a substantially rigid substrate.

23. An improved electrochromic device as set forth in claim 21, wherein said substrate is a substantially flexible substrate.

24. An improved electrochromic device as set forth in claim 21, including conductive bus bars located on the first conductive layer and located on the transparent substrate.

25. An improved electrochromic device as set forth in claim 21, wherein at least one of said layers is disposed by vacuum deposition.

26. An improved electrochromic device as set forth in claim 21, wherein at least one of said layers is disposed by plasma enhanced chemical vapor deposition (PECVD).

27. An improved electrochromic device as set forth in claim 21, including a protective layer comprised of $SiO_2$ which covers the entire electrochromic stack and bonds to the periphery of the substrate providing a hermetic encapsulation for the electrochromic device.

28. An improved transmissive electrochromic device, comprising a monolithic stack of solid state inorganic materials deposited directly onto a transparent or translucent substrate comprised of glass, polymer, or fiberglass reinforced polymer, comprising:

a first electrically conductive layer, which is substantially transparent, comprised of ITO located on the top surface of said transparent or translucent substrate with the following properties;

said layer covers the top surface of the substrate except for a narrow strip around the periphery at the edges of the substrate and a larger rectangular area along one edge with the longer dimension of the rectangle being aligned with the edge of the substrate;

the edge of the ITO bordering the uncovered rectangular area is smoothly tapered from the top of the ITO layer to the top surface of the underlying substrate to provide a smooth transition for the subsequently applied layers whose electrical and mechanical properties can be adversely affected by an abrupt transition;

an ion storage layer, comprised of vanadium pentoxide ($V_2O_5$), located on the top surface of the first electrically conductive layer and extending across the tapered edge of the ITO to the uncoated area of the substrate;

an electrolyte layer, comprised of amorphous $Li_3PO_4$, located on the top surface of the ion storage layer and extending across the tapered edge of the ITO beyond the edge of the $Li_3PO_4$ to the uncoated area of the substrate;

an active layer located on the electrolyte layer, comprised of amorphous or polycrystalline $WO_3$, located on the top surface of the electrolyte layer;

a nickel contact for the second electrically conductive layer located on the top surface of the substrate in the uncoated rectangular area;

a second electrically conductive layer, which is substantially transparent, comprised of ITO, fluorine doped tin oxide, or a grid of metallic or electrically conductive material, located on the top surface of the active layer and extending across the tapered edge of the ITO onto the top of a portion of the nickel contact;

an electrical contact for the first electrically conductive layer comprised of a Ni pad, suitable for establishing an electrical connection, located on the top surface of the second electrically conductive layer; and a protective layer comprised of $SiO_2$ which covers the entire electrochromic stack and bonds to the periphery of the substrate providing a hermetic encapsulation for the electrochromic device.

29. An improved electrochromic device as set forth in claim 28, wherein said substrate is a substantially rigid substrate.

30. An improved electrochromic device as set forth in claim 28, wherein said substrate is a substantially flexible substrate.

31. An improved reflective electrochromic device, comprising a monolithic stack of solid state inorganic materials deposited directly onto a transparent or translucent substrate comprised of glass, polymer, or fiberglass reinforced polymer; comprising:

a first electrically conductive layer, which is substantially transparent, comprised of ITO, fluorine doped tin oxide, or a grid of metallic or electrically conductive material, located on the top surface of said transparent or translucent substrate;

an ion storage layer, comprised of vanadium pentoxide ($V_2O_5$), located on the top surface of the first electrically conductive layer;

an electrolyte layer, comprised of amorphous $Li_3PO_4$, located on the top surface of the ion storage layer;

said electrolyte layer having a thickness less than 1000 angstroms;

an active layer located on the electrolyte layer, comprised of amorphous or polycrystalline $WO_3$, located on the top surface of the electrolyte layer;

and a second electrically conductive layer, which is optically reflective, comprised of aluminum, silver, or any optically reflective and electrically conductive material, located on the top surface of the active layer;

an electrical contact for the first electrically conductive layer comprised of a Ni pad, suitable for establishing an electrical connection, located on the top surface of the first electrically conductive layer in an area not covered by the ion storage layer, the ion conductor layer, the active layer, or the second electrically conductive layer; and an electrical contact for the second electrically conductive layer comprised of a Ni pad, suitable for establishing an electrical connection, located on the top surface of the substrate in an area not covered by any layers except the second electrically conductive layer.

32. An improved reflective electrochromic device, comprising a monolithic stack of solid state inorganic materials deposited directly onto a flexible transparent or translucent substrate comprised of glass, polymer, or fiberglass reinforced polymer, comprising:

a first electrically conductive layer, which is substantially transparent, comprised of ITO located on the top surface of said transparent or translucent substrate with the following properties;

said layer covers the top surface of the substrate except for a narrow strip around the periphery at the edges of the substrate and a larger rectangular area along one edge with the longer dimension of the rectangle being aligned with the edge of the substrate;

the edge of the ITO bordering the uncovered rectangular area is smoothly tapered from the top of the ITO layer to the top surface of the underlying substrate to provide a smooth transition for the subsequently applied layers whose electrical and mechanical properties can be adversely affected by an abrupt transition;

an ion storage layer, comprised of vanadium pentoxide ($V_2O_5$), located on the top surface of the first electrically conductive layer and extending across the tapered edge of the ITO to the uncoated area of the substrate;

an electrolyte layer, comprised of amorphous Li3PO4, located on the top surface of the ion storage layer and extending across the tapered edge of the ITO beyond the edge of the $Li_3PO_4$ to the uncoated area of the substrate;

an active layer located on the electrolyte layer, comprised of amorphous or polycrystalline $WO_3$, located on the top surface of the electrolyte layer;

a nickel contact for the second electrically conductive layer located on the top surface of the substrate in the uncoated rectangular area;

a second electrically conductive layer, which is optically reflective, comprised of silver, aluminum, or other electrically conductive and optically reflective material, located on the top surface of the active layer and extending across the tapered edge of the ITO onto the top of a portion of the nickel contact;

an electrical contact for the first electrically conductive layer comprised of a Ni pad, suitable for establishing an electrical connection, located on the top surface of the second electrically conductive layer; and a protective layer comprised of $SiO_2$ which covers the entire electrochromic stack and bonds to the periphery of the substrate providing a hermetic encapsulation for the electrochromic device.

33. An improved electrochromic device as set forth in claim 32, wherein said substrate is a substantially rigid substrate.

34. An improved electrochromic device as set forth in claim 32, wherein said substrate is a substantially flexible substrate.

* * * * *